United States Patent
Kim

(10) Patent No.: US 12,170,373 B2
(45) Date of Patent: Dec. 17, 2024

(54) SULFUR-CARBON COMPOSITE, METHOD FOR PREPARING SAME, AND LITHIUM SECONDARY BATTERY COMPRISING SAME

(71) Applicant: LG CHEM, LTD., Seoul (KR)

(72) Inventor: Soohyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 952 days.

(21) Appl. No.: 17/257,679

(22) PCT Filed: Oct. 31, 2019

(86) PCT No.: PCT/KR2019/014640
§ 371 (c)(1),
(2) Date: Jan. 4, 2021

(87) PCT Pub. No.: WO2020/091478
PCT Pub. Date: May 7, 2020

(65) Prior Publication Data
US 2021/0119216 A1    Apr. 22, 2021

(30) Foreign Application Priority Data
Oct. 31, 2018 (KR) .................. 10-2018-0132423
Oct. 31, 2019 (KR) .................. 10-2019-0137949

(51) Int. Cl.
*H01M 4/62* (2006.01)
*C08K 3/04* (2006.01)
(Continued)

(52) U.S. Cl.
CPC .............. *H01M 4/624* (2013.01); *C08K 3/041* (2017.05); *C08K 3/042* (2017.05); *C08K 3/06* (2013.01);
(Continued)

(58) Field of Classification Search
CPC ..... H01M 2300/0082; H01M 10/0525; H01M 4/362; H01M 4/38; H01M 4/587;
(Continued)

(56) References Cited

U.S. PATENT DOCUMENTS

2015/0155559 A1   6/2015   Zimmerman et al.
2015/0188144 A1   7/2015   Shin et al.
(Continued)

FOREIGN PATENT DOCUMENTS

CN    107925042 A    4/2018
JP    2016-540353 A  12/2016
(Continued)

OTHER PUBLICATIONS

Machine translation of WO-2018084449-A2 (Year: 2018).*
(Continued)

*Primary Examiner* — Matthew T Martin
*Assistant Examiner* — Unique Jenevieve Luna
(74) *Attorney, Agent, or Firm* — Birch, Stewart, Kolasch & Birch, LLP

(57) ABSTRACT

A sulfur-carbon composite including a porous carbon material including interior and exterior surfaces coated with a polymer including an ion conductive functional group and an electron conductive functional group; and sulfur present on at least a portion of inside pores and on a surface of the porous carbon material.

9 Claims, 7 Drawing Sheets

(51) Int. Cl.
  *C08K 3/06* (2006.01)
  *H01M 4/02* (2006.01)
  *H01M 4/36* (2006.01)
  *H01M 4/38* (2006.01)
  *H01M 4/587* (2010.01)
  *H01M 10/0525* (2010.01)
  *H01M 10/0565* (2010.01)

(52) U.S. Cl.
  CPC ............ *H01M 4/362* (2013.01); *H01M 4/38* (2013.01); *H01M 4/587* (2013.01); *H01M 10/0525* (2013.01); *H01M 10/0565* (2013.01); *C08K 2201/011* (2013.01); *H01M 2004/028* (2013.01); *H01M 2300/0082* (2013.01)

(58) Field of Classification Search
  CPC ....... H01M 2004/028; H01M 10/0565; H01M 4/624; C08K 3/041–042; C08K 3/06; C08K 2201/011
  See application file for complete search history.

(56) References Cited

U.S. PATENT DOCUMENTS

| | | |
|---|---|---|
| 2016/0190538 A1 | 6/2016 | Lee et al. |
| 2018/0019471 A1 | 1/2018 | Wu et al. |
| 2018/0198156 A1 | 7/2018 | Lee et al. |
| 2019/0245203 A1 | 8/2019 | Cho et al. |

FOREIGN PATENT DOCUMENTS

| | | |
|---|---|---|
| KR | 10-2015-0078432 A | 7/2015 |
| KR | 10-1704146 B1 | 2/2017 |
| KR | 10-1726127 B1 | 4/2017 |
| KR | 10-2017-0085195 A | 7/2017 |
| KR | 10-2018-0048309 A | 5/2018 |
| KR | 10-2018-0058605 A | 6/2018 |
| WO | WO 2017/205634 A1 | 11/2017 |
| WO | WO 2018/075469 A1 | 4/2018 |
| WO | WO 2018/084449 A2 | 5/2018 |

OTHER PUBLICATIONS

Machine translation of KR 20170085195 A (Year: 2017).*
Machine translation of KR 101726127 B1 (Year: 2016).*
Arumugam Manthiram et al. (Rechargeable Lithium-Sulfur Batteries, Chemical Reviews 2014 114 (23), 11751-11787, DOI: 10.1021/cr500062v) (Year: 2014).*
International Search Report (PCT/ISA/210) issued in PCT/KR2019/014640, dated Feb. 12, 2020.
Ma et al., "Enhanced cycle performance of a Li—S battery based on a protected lithium anode," Journal of Materials Chemistry A, vol. 2, 2014, pp. 19355-19359.
European Search Report for Appl. No. 19880684.6 dated Jul. 21, 2021.
Yang. Y., et al., "Improving the Performance of Lithium-Sulfur Batteries by Conductive Polymer Coating." ACS Nano, 2011, vol. 5, No. 11, pp. 9187-9193.

* cited by examiner

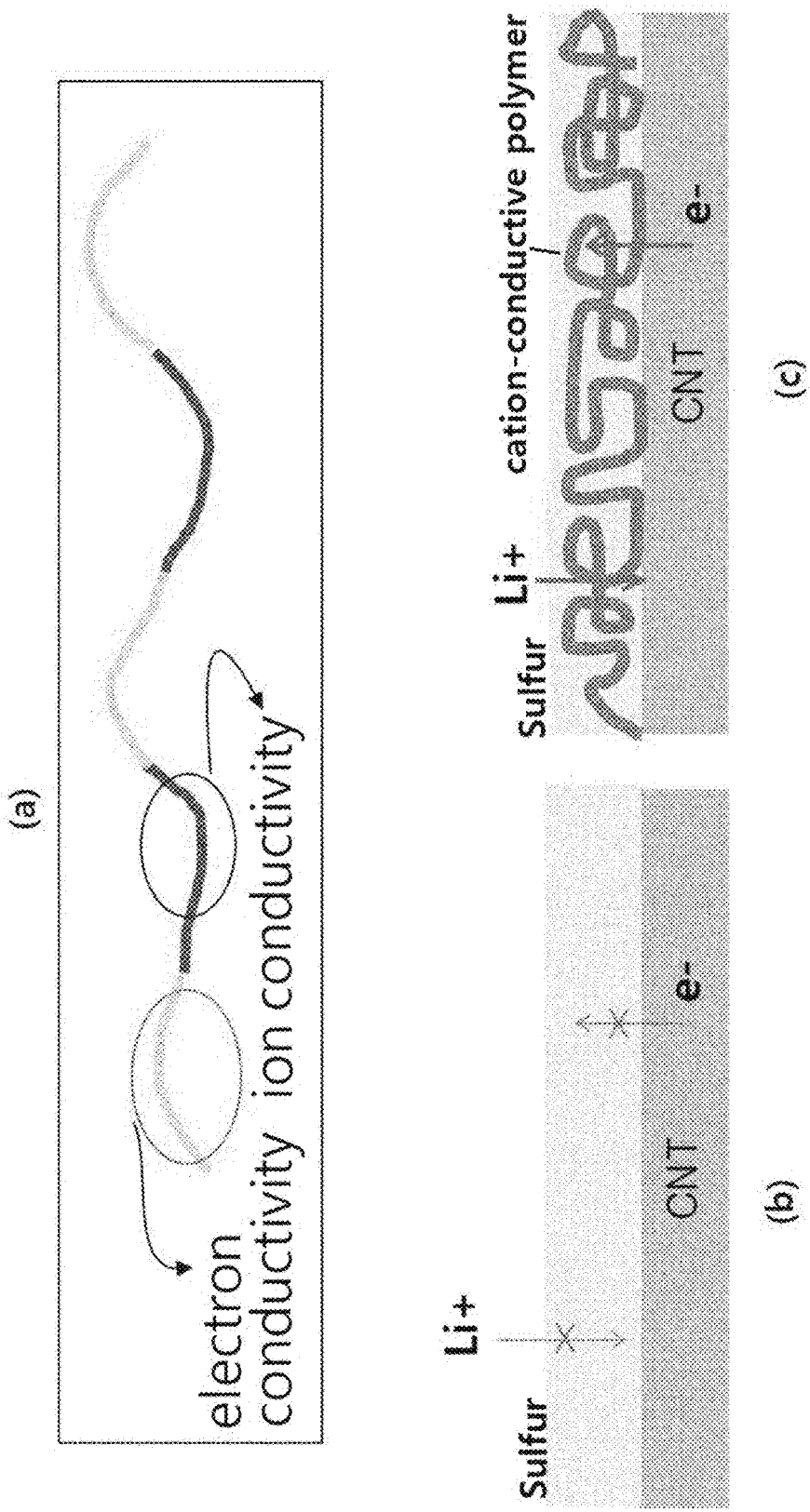
[Figure 1]

[Figure 2]
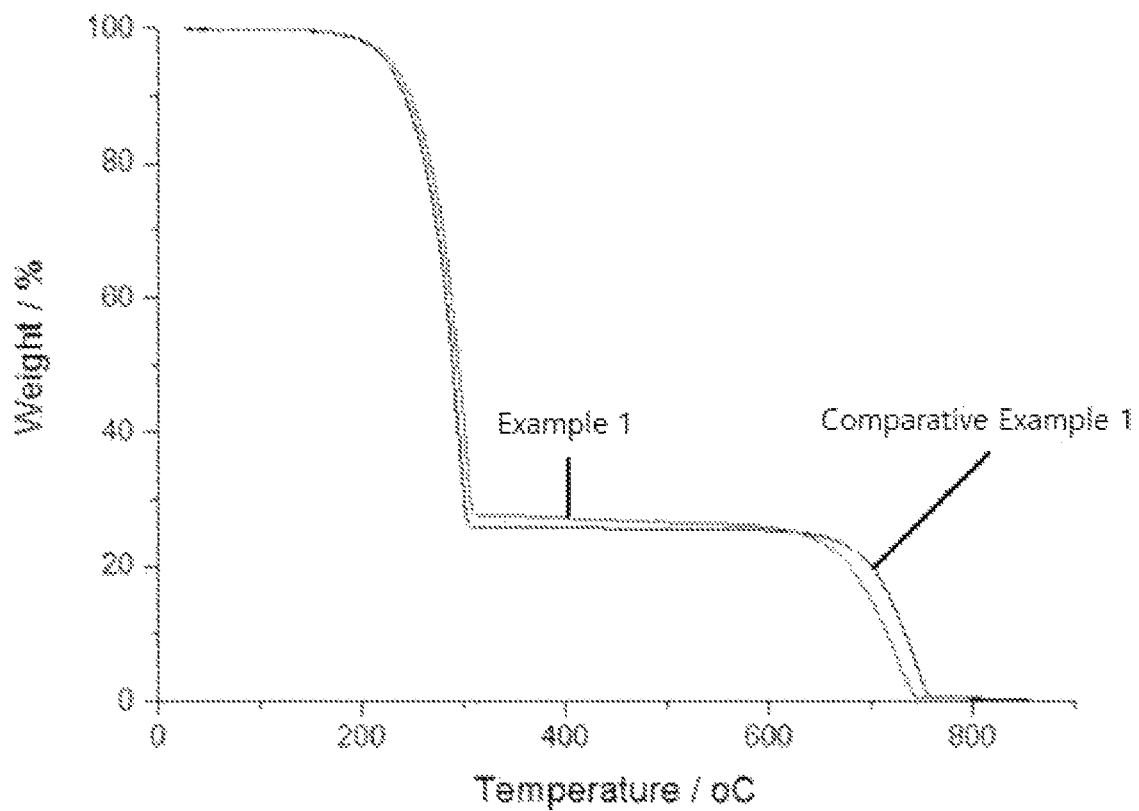

[Figure 3]
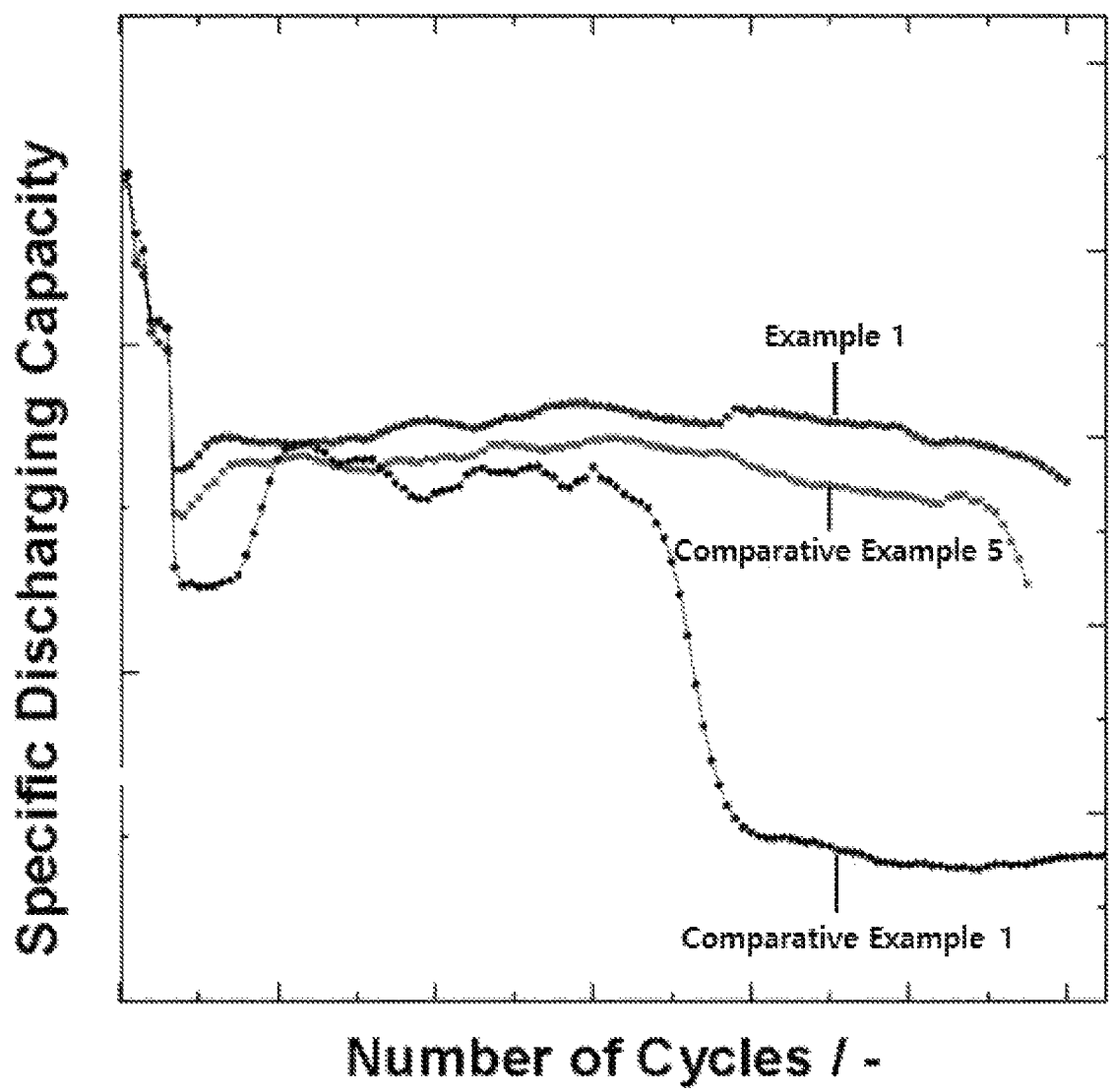

【Figure 4】
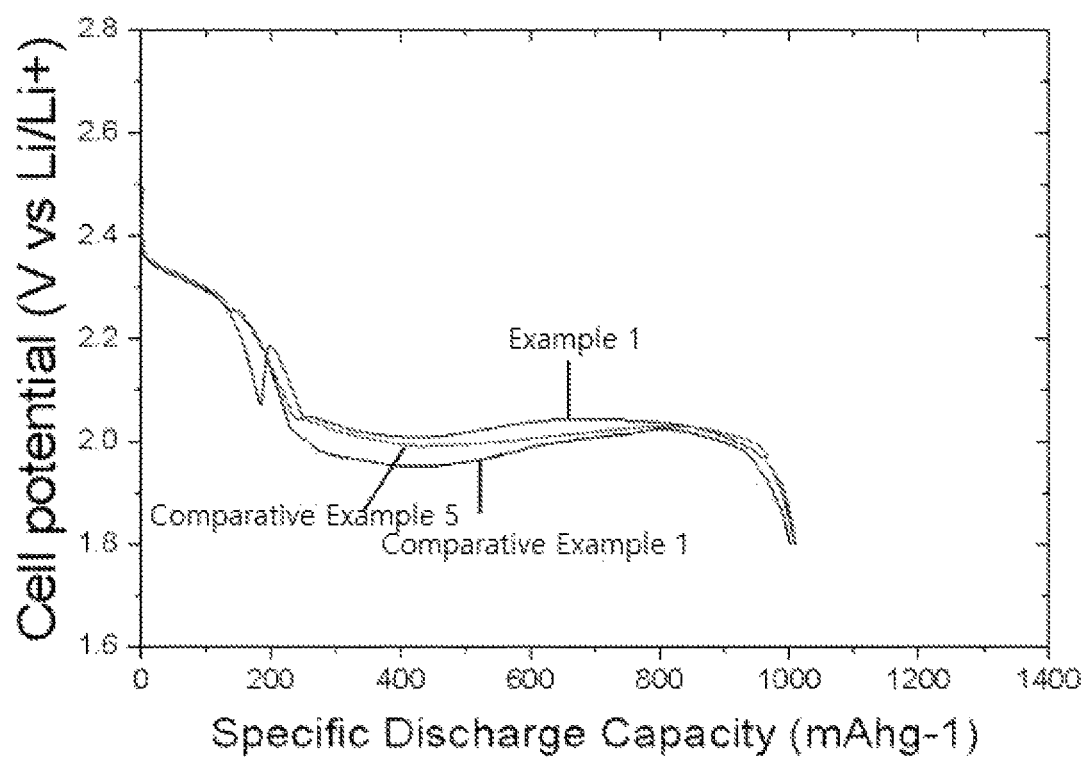

【Figure 5】
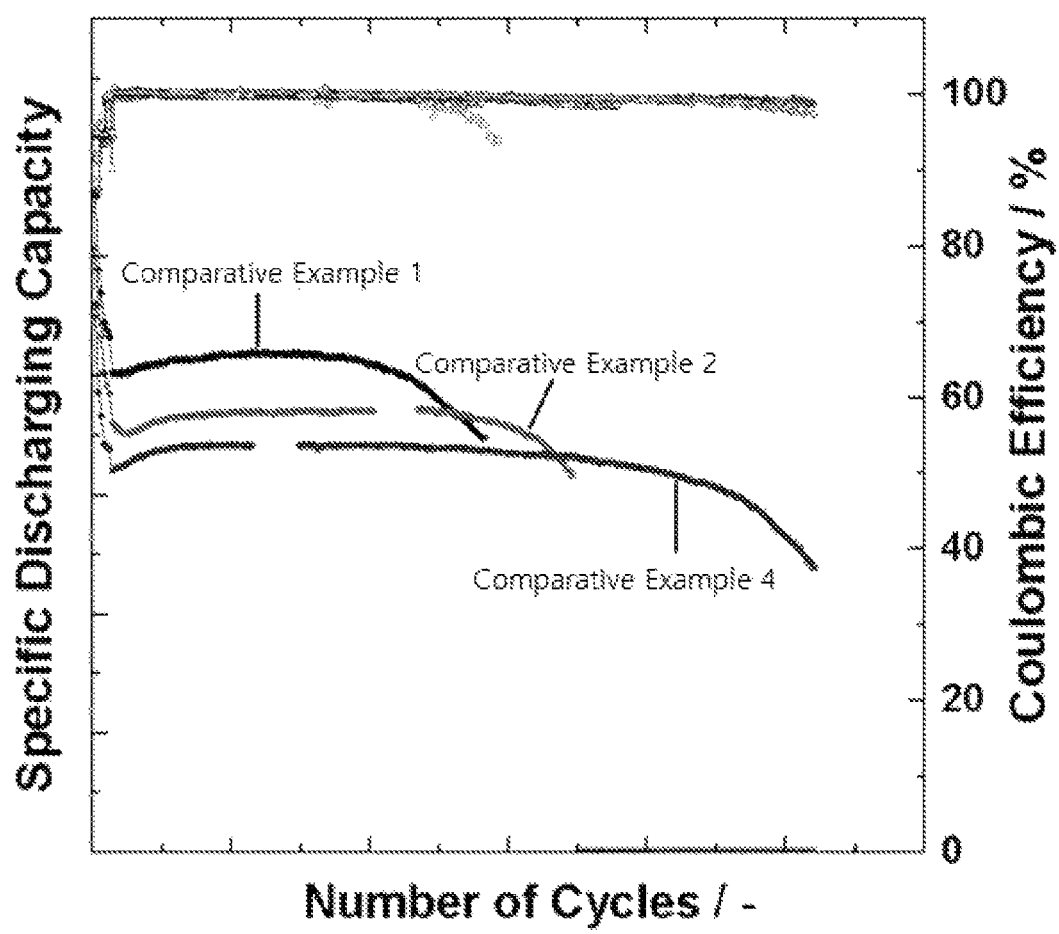

[Figure 6]
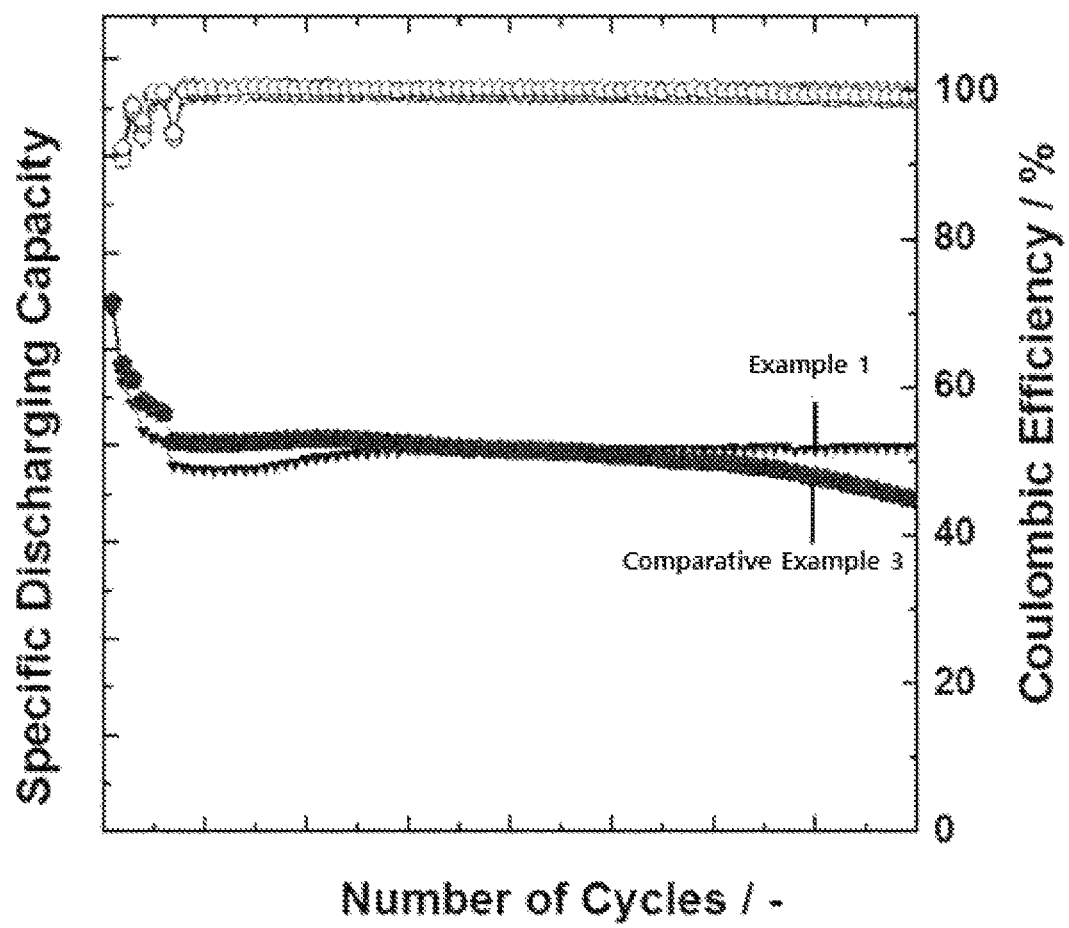

[Figure 7]
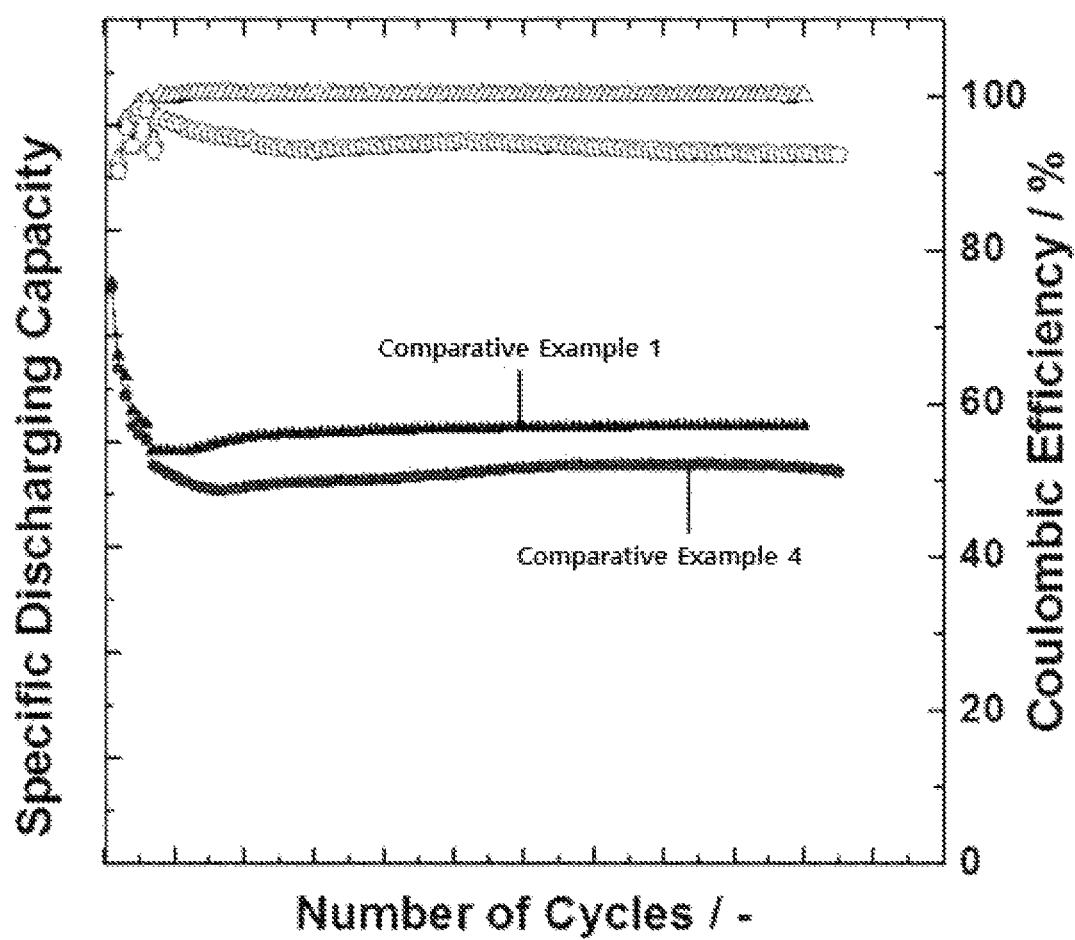

SULFUR-CARBON COMPOSITE, METHOD FOR PREPARING SAME, AND LITHIUM SECONDARY BATTERY COMPRISING SAME

TECHNICAL FIELD

The present application claims the benefit of priority based on Korean Patent Application No. 10-2018-0132423 filed on Oct. 31, 2018, and Korean Patent Application No. 10-2019-0137949 filed on Oct. 31, 2019, all the contents of which are incorporated herein by reference.

The present invention relates to a sulfur-carbon composite and a lithium secondary battery including the same.

BACKGROUND ART

Recently, there is increasing interest in energy storage technology. As the application area thereof extends to the energy for mobile phones, camcorders, notebook PCs, and even electric vehicles, the effort of research and development of electrochemical devices is being carried out more and more concretely.

Electrochemical devices are the most noteworthy area in this respect, and among them, the development of a secondary battery capable of charging•discharging is the focus of attention. Recently, in developing these batteries, research and development on the design of new electrodes and batteries have been conducted in order to improve capacity density and energy efficiency.

Among the secondary batteries currently being applied, the lithium secondary battery developed in the early 1990s is attracting much attention as there is an advantage in that it has much higher operating voltage and energy density than conventional batteries such as Ni-MH, Ni—Cd, and sulfuric acid-lead batteries using an electrolyte solution in the form of an aqueous solution.

The lithium-sulfur battery is a secondary battery using a sulfur-based material having a sulfur-sulfur bond (S—S bond) as a positive electrode active material and using lithium metal as a negative electrode active material. The lithium-sulfur battery has advantages in that sulfur, which is the main material of the positive electrode active material, is very rich in resources, is not toxic, and has a low atomic weight. In addition, theoretical discharge capacity of the lithium-sulfur battery is 1,675 mAh/g-sulfur, and its theoretical energy density is 2,600 Wh/kg. Since the energy density of the lithium-sulfur battery is much higher than the theoretical energy density of other battery systems currently under study (Ni-MH battery: 450 Wh/kg, Li—FeS battery: 480 Wh/kg, Li—MnO$_2$ battery: 1,000 Wh/kg, Na—S battery: 800 Wh/kg), the lithium-sulfur battery is the most promising battery among the batteries developed so far.

During the discharging of the lithium-sulfur battery, an oxidation reaction of lithium occurs at the negative electrode (anode) and a reduction reaction of sulfur occurs at the positive electrode (cathode). Sulfur before discharging has an annular S$_8$ structure. During the reduction reaction (discharging), as the S—S bond is cut off, the oxidation number of S decreases, and during the oxidation reaction (charging), as the S—S bond is re-formed, the oxidation number of S increases. Using the oxidation-reduction reaction, the electrical energy is stored and generated. During this reaction, the sulfur is converted from the annular S$_8$ structure to the lithium polysulfide (Li$_2$S$_x$, x=8, 6, 4, 2) with linear structure by the reduction reaction and eventually, when the lithium polysulfide is completely reduced, lithium sulfide (Li$_2$S) is finally produced. By the process of reducing to each lithium polysulfide, the discharging behavior of the lithium-sulfur battery is characterized by a step-wise discharge voltage unlike lithium ion battery.

However, in the case of lithium-sulfur battery, the problems of the low electrical conductivity of sulfur, the leaching of lithium polysulfide during charging and discharging, and volume expansion, and the resulting problems of low coulomb efficiency and rapid capacity reduction according to charging/discharging should be resolved.

In particular, when the low-loading sulfur is supported in a conventional lithium sulfur battery, the results of sufficiently expressing the reactivity of sulfur has been known through various experiments. When increasing the loading of sulfur, there was a problem that the reactivity is sharply lowered.

When the functional polymer (adsorption/catalyst/conductive polymer) is coated on porous carbon material or sulfur-carbon composite in order to increase the reactivity in high loading, a result that shows the effect on the coating in the case of low loading is reported. However, in the case of a large amount of sulfur, when a high concentration of the polymer is coated to solve this problem, it was resulted that the reactivity is rather lowered and the resistance component is increased.

Therefore, there is a need to find a solution that can increase the reactivity, even when using high concentrations of sulfur, by coating the porous carbon material with a material having both lithium ion conductivity and electron conductivity, so that even when a high content of sulfur is used, no overvoltage occurs and a functional group acts its part.

PRIOR ART DOCUMENT

Patent Document (Patent Document 1) Korea Patent Registration No. 10-1592658, "A surface-treated cathode active material and lithium secondary battery using it"

DISCLOSURE

Technical Problem

After conducting various studies, the inventors of the present invention have completed the present invention by confirming that by coating a polymer having lithium ion conductivity and electron conductivity inside the porous carbon material, even if a high content of sulfur is loaded, the reactivity can be improved.

Therefore, the present invention is to provide a sulfur-carbon composite supporting sulfur by coating and drying a polymer having lithium ion conductivity and electron conductive inside the porous carbon material and a preparation method thereof.

Technical Solution

In order to achieve the above object, the present invention provides a sulfur-carbon composite comprising: a porous carbon material whose inner and exterior surfaces are coated with a polymer comprising an ion conductive functional group and an electron conductive functional group, and sulfur on at least a portion of the interior and surface of the porous carbon material.

In addition, the present invention provides a method for preparing the sulfur-carbon composite comprising the steps of (a) preparing a porous carbon material coated with a polymer comprising an ion conductive functional group and an electron conductive functional group by mixing a porous carbon material in a solution comprising a polymer comprising the ion conductive functional group and the electron conductive functional group and then drying it; and (b) preparing a sulfur-carbon composite by mixing sulfur with the porous carbon material coated with the polymer comprising the ion conductive functional group and the electron conductive functional group, and then heat-treating it.

In addition, the present invention provides a positive electrode for a lithium secondary battery comprising the sulfur-carbon composite.

In addition, the present invention provides a lithium secondary battery comprising the positive electrode, a negative electrode, and an electrolyte.

Advantageous Effects

Unlike the general coating materials used in the prior art, in order to solve the problems that the reactivity is degraded when a high content of sulfur is loaded and that the reactivity during high-rate charging/discharging is decreased, the sulfur-carbon composite of the present invention has a characteristic of being prepared by coating a polymer comprising a functional group that increases the mobility of lithium ions and a functional group that enhances the mobility of electrons, on the porous carbon material.

Therefore, the sulfur-carbon composite of the present invention provides an effect of reducing the occurrence of overvoltage generated during battery operation and increasing the reactivity of sulfur, while containing sulfur in high content.

DESCRIPTION OF DRAWINGS

FIG. 1 is a schematic diagram showing the function depending on the structure of the polymer of the present invention.

FIG. 2 is a graph showing the results of thermogravimetry of sulfur-carbon composites according to an example of the present invention and a comparative example.

FIG. 3 is a graph showing the lifetime characteristics of the lithium-sulfur batteries made of the sulfur-carbon composites of Example 1 of the present invention and Comparative Examples 1 and 5.

FIG. 4 is a graph showing the over-voltage protection performances of the lithium-sulfur batteries made of the sulfur-carbon composites of Example 1 of the present invention and Comparative Examples 1 and 5.

FIG. 5 is a graph showing the lifetime characteristics of the lithium-sulfur batteries made of the sulfur-carbon composites of Example 1 of the present invention and Comparative Examples 1, 2 and 4.

FIG. 6 is a graph showing the lifetime characteristics of the lithium-sulfur batteries made of the sulfur-carbon composites of Example 1 of the present invention and Comparative Example 3.

FIG. 7 is a graph showing the lifetime characteristics of the lithium-sulfur batteries made of Comparative Examples 1 and 4.

BEST MODE

Hereinafter, the present invention will be described in detail with reference to the accompanying drawings so that those skilled in the art can easily carry out the present invention. However, the present invention can be embodied in various different forms, and is not limited thereto.

In the drawings, in order to clearly illustrate the present invention, parts that are not related to the description of the present invention are omitted, and similar reference numerals are used for similar parts throughout the specification. Also, the size and relative size of the components shown in the figures are independent of the actual scale and may be reduced or exaggerated for clarity of description.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases to each other.

A lithium-sulfur battery, which is an embodiment of the lithium secondary battery, uses sulfur as a positive electrode active material and lithium metal as a negative electrode active material. When the lithium-sulfur battery is discharged, oxidation of lithium occurs at the negative electrode and reduction of sulfur occurs at the positive electrode. In this case, the reduced sulfur is combined with lithium ions transferred from the negative electrode, and converted to lithium polysulfide, followed by a reaction to finally form lithium sulfide.

Since the lithium-sulfur battery has a much higher theoretical energy density than the conventional secondary battery and sulfur, which is used as a positive electrode active material, has the advantage of being abundant in reserves and low in price and being environmentally friendly, the lithium-sulfur battery is gaining popularity as a next-generation battery.

Despite these advantages, it is difficult to realize all the theoretical energy density in the actual operation, due to the low electrical conductivity and lithium ion conductivity of sulfur which is a positive electrode active material.

In particular, in the conventional lithium sulfur battery, when low loading sulfur is supported, the results of sufficiently expressing the reactivity of sulfur has been known through several experiments. However, in the case of increasing the loading of sulfur, there is a problem that the reactivity is rapidly lowered.

When the functional polymer (adsorption/catalyst/conductive polymer) is coated on porous carbon material or sulfur-carbon composite in order to increase the reactivity in high loading, a result that shows the effect on the coating in the case of low loading is reported. However, when sulfur is highly loaded, it was difficult to achieve the desired effect. Accordingly, in order to solve this problem, a method of coating a polymer at a high concentration has also been studied, but the coating of a high concentration of the polymer has rather lowered the reactivity and resulted in inhibiting the effect by the increase in the resistance component.

Therefore, there is a need to find a solution that can increase the reactivity, even when using high concentrations of sulfur, by coating the porous carbon material with a material having both lithium ion conductivity and electron conductivity, so that even when a high content of sulfur is used, no overvoltage occurs and the functional group acts its part.

Sulfur-Carbon Composite

Therefore, in order to secure the effect of improving the reactivity between the sulfur-carbon composite and the electrolyte, and the capacity and efficiency characteristics of the lithium secondary battery, the present invention provides a sulfur-carbon composite comprising a porous carbon material comprising interior and exterior surfaces are-coated with a polymer comprising an ion conductive functional group and an electron conductive functional group; and sulfur present on at least a portion of inside pores and on a surface of the porous carbon material.

The porous carbon material provides a framework in which sulfur which is a positive electrode active material can be uniformly and stably immobilized, and the electrical conductivity of sulfur is supplemented to enable the electrochemical reaction to proceed smoothly.

The porous carbon material can be generally produced by carbonizing precursors of various carbon materials. The porous carbon material may comprise uneven pores therein, the average diameter of the pores is in the range of 1 to 200 nm, and the porosity may be in the range of 10 to 90% of the total volume of the porosity. If the average diameter of the pores is less than the above range, the pore size is only at the molecular level and impregnation with sulfur is impossible. On the contrary, if the average diameter of the pores exceeds the above range, the mechanical strength of the porous carbon is weakened, which is not preferable for application to the manufacturing process of the electrode.

The shape of the porous carbon material is in the form of sphere, rod, needle, plate, tube, and bulk, and can be used without limitation as long as it is commonly used in a lithium secondary battery.

The porous carbon material may have a porous structure or a high specific surface area, and may be any of those conventionally used in the art. For example, the porous carbon material may be, but is not limited to, at least one selected from the group consisting of graphite; graphene; carbon blacks such as Denka black, acetylene black, Ketjen black, channel black, furnace black, lamp black, and thermal black; carbon nanotubes (CNTs) such as single wall carbon nanotube (SWCNT) and multiwall carbon nanotubes (MWCNT); carbon fibers such as graphite nanofiber (GNF), carbon nanofiber (CNF), and activated carbon fiber (ACF); and activated carbon.

The sulfur may be at least one selected from the group consisting of inorganic sulfur ($S_8$), $Li_2S_n$ ($n\geq1$), organic sulfur compound and carbon-sulfur polymer [$(C_2S_x)_n$, x=2.5 to 50, n≥2]. Preferably, inorganic sulfur ($S_8$) can be used.

In the sulfur-carbon composite according to the present invention, the weight ratio of sulfur and the porous carbon material may be 9:1 to 7:3. If the content of sulfur is less than 70% by weight, as the content of the porous carbon material increases, the addition amount of the binder required for preparing the positive electrode slurry is increased. Such an increase in the addition amount of binder will eventually increase the sheet resistance of the electrode and may serve as an insulator for blocking the electron pass, thereby degrading the cell performance. On the contrary, if the content of sulfur exceeds 90% by weight, since sulfur is agglomerated with each other and difficult to receive electron, sulfur may be difficult to participate directly in the reaction of the electrode.

More preferably, the weight ratio of sulfur and porous carbon material in the sulfur-carbon composite of the present invention may be 9:1 to 7.5:2.5.

In addition, sulfur is located on the surface as well as inside the pores of the porous carbon material, and at this time, sulfur may be present in an area of less than 100%, preferably 1 to 95%, more preferably 60 to 90% of the entire outer surface of the porous carbon material. When sulfur is within the above range on the surface of the porous carbon material, it can exhibit the maximum effect in terms of the electron transfer area and the wettability of the electrolyte solution. Specifically, since sulfur is impregnated thinly and evenly on the surface of the porous carbon material in the above range, the electron transfer contact area can be increased during the charging/discharging process. If sulfur is located in the 100% area of the surface of the porous carbon material, the porous carbon material is completely covered with sulfur, so that the wettability of the electrolyte solution is deteriorated and the contact property with the conductive material contained in the electrode are decreased, and thus the electrons are not transmitted and it cannot participate in the reaction.

The sulfur-carbon composite can carry sulfur in a high content due to various sizes of pores in the structure and three-dimensionally interconnected and regularly arranged pores. Therefore, although a soluble polysulfide is produced by an electrochemical reaction, if it can be located inside a sulfur-carbon composite, the structure entangled in three dimensions can be maintained to suppress the collapse of the positive electrode structure even in the case of polysulfide leaching. As a result, the lithium secondary battery comprising the sulfur-carbon composite has an advantage that high capacity can be realized even under high loading.

Therefore, the sulfur loading amount of the sulfur-carbon composite according to the present invention may be 5 to 20 $mg/cm^2$.

As described above, in the case where the loading amount of sulfur in the sulfur-carbon composite is high, there is a problem that overvoltage increases and reactivity decreases due to the entrance and exit of lithium ions and the presence of sulfur, which is a nonconductor, as shown in (b) of FIG. 1.

However, in the case of the sulfur-carbon composite of the present invention, the interior and exterior surfaces of the porous carbon material are coated with a polymer comprising an ion conductive functional group and an electron conductive functional group. Accordingly, in the case of the CNT coated with the polymer despite the high loading of sulfur, the entrance and exit of lithium ions are possible (the role of the block portion to function for the ion conductivity of (a) of FIG. 1), and the overvoltage is improved (the role of the block portion to function for the electron conductivity of (a) of FIG. 1), thereby improving the overall reactivity, as shown in (c) of FIG. 1.

Thus, in the case of the sulfur-carbon composite of the present invention, the interior and exterior surfaces of the porous carbon material are coated with a polymer comprising an ion conductive functional group and an electron conductive functional group.

The polymer comprising an ion conductive functional group and an electron conductive functional group may comprise one or more compounds selected from the group consisting of PEG-polyethylene glycol (PEG) and Poly Ethylene oxide; and one or more compounds selected from the group consisting of poly (3,4-ethylenedioxythiophene) (PEDOT), Thiophene, and Pyrrole.

In the polymer comprising an ion conductive functional group and an electron conductive functional group as used in the present invention, a compound such as PEG, Poly Ethylene oxide, etc., may be comprised to act as an ion conductive functional group, and also a compound such as PEDOT, Thiophene, Pyrrole, etc., may be comprised to act as an electron conductive functional group.

Specifically, the polymer comprising an ion conductive functional group and an electron conductive functional group may be a compound of Formula 1 below:

[Formula 1]

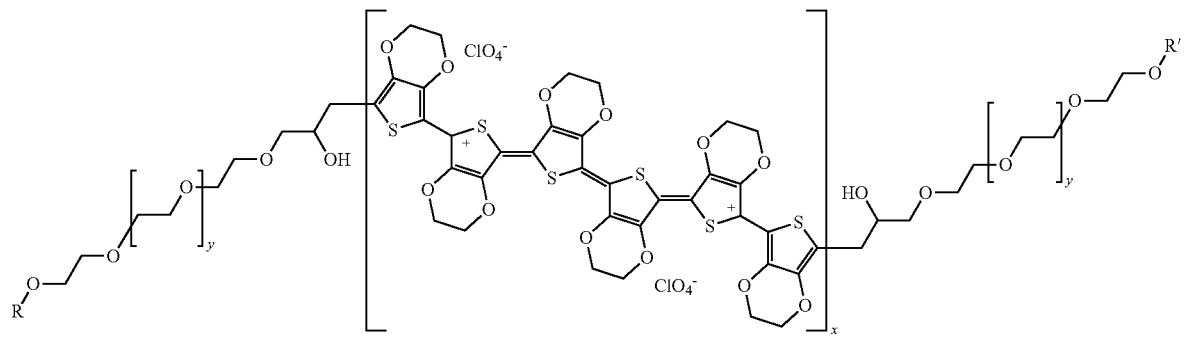

wherein x and y are the ratios of the respective monomers, x is 0 to 1, y is 1-x, and R and R' are each independently a $C_1$ to $C_{20}$ hydrocarbon group.

The weight average molecular weight of the compound of Formula 1 is 1,000 to 1,000,000.

More preferably, R and R' are each independently a $C_5$ to $C_{15}$ hydrocarbon group, and as a specific example, R and R' may be $C_{12}H_{25}$.

The content of the polymer comprising an ion conductive functional group and an electron conductive functional group as used in the present invention may be 0.5 to 5.0% by weight, preferably 1.0 to 3.0% by weight relative to the total weight of the sulfur-carbon composite. If the content of the polymer containing lithium ions is less than 0.5% by weight, the effect is insignificant, and if the content of the polymer containing the lithium ion exceeds 5% by weight, there is a problem that overvoltage occurs.

Preparation Method of Sulfur-Carbon Composite

The sulfur-carbon composite of the present invention is prepared through the steps of:
(a) preparing a porous carbon material coated with a polymer comprising an ion conductive functional group and an electron conductive functional group by mixing a porous carbon material in a solution comprising a polymer comprising the ion conductive functional group and the electron conductive functional group and then drying it; and
(b) preparing a sulfur-carbon composite by mixing sulfur with the porous carbon material coated with the polymer comprising the ion conductive functional group and the electron conductive functional group, and then heat-treating it.

First, the method of preparing the sulfur-carbon composite of the present invention comprises step (a) of preparing a porous carbon material coated with a polymer comprising an ion conductive functional group and an electron conductive functional group by mixing a porous carbon material in a solution comprising a polymer comprising the ion conductive functional group and the electron conductive functional group and then drying it.

First, in step (a), in order to coat a porous carbon material with a polymer comprising an ion conductive functional group and an electron conductive functional group, a coating composition is prepared by mixing a highly volatile solvent such as ethanol or THF with a polymer comprising an ion conductive functional group and an electron conductive functional group. Thereafter, the composition is mixed with a porous carbon material and then dried. Upon drying, the prepared porous carbon material may be dried at 70 to 150° C. for 15 minutes to 1 hour.

If the drying temperature and drying time of the porous carbon material satisfy the above range, the volatile solvent may be sufficiently volatilized to uniformly coat the polymer comprising lithium ions in the composite.

The characteristics of the polymer comprising the ion conductive functional group and the electron conductive functional group and the porous carbon material used in step (a) are the same as those described above.

Thereafter, the method for preparing the sulfur-carbon composite of the present invention comprises step (b) of preparing a sulfur-carbon composite by mixing sulfur with the porous carbon material coated with the polymer comprising the ion conductive functional group and the electron conductive functional group, and then heat-treating it.

In step (b), when the sulfur and the porous carbon material are mixed, the weight ratio of the sulfur and the porous carbon material may be 9:1 to 7:3. If the content of sulfur is less than the weight ratio above, as the content of the porous carbon material increases, the addition amount of the binder required for preparing the positive electrode slurry is increased. Such an increase in the addition amount of binder will eventually increase the sheet resistance of the electrode and may serve as an insulator for blocking the electron pass, thereby degrading the cell performance. On the contrary, if the content of sulfur exceeds the weight ratio above, since sulfur is agglomerated with each other and difficult to receive electron, sulfur may be difficult to participate directly in the reaction of the electrode.

More preferably, the weight ratio of sulfur and porous carbon material in the sulfur-carbon composite of the present invention may be 9:1 to 7.5:2.5.

The characteristics of sulfur used in step (b) are the same as the above.

When sulfur and the porous carbon material mixed in the step (b) are heat-treated to support sulfur in the porous carbon material to produce a sulfur-carbon composite, general heat treatment methods used in the art may be used, and preferably the heat-treatment may be performed through melt diffusion.

Positive Electrode

The sulfur-carbon composite proposed in the present invention may be preferably used as a positive electrode active material of a lithium secondary battery.

The positive electrode is manufactured by applying and drying a composition for forming a positive electrode active material layer on a positive electrode current collector. The composition for forming a positive electrode active material layer is prepared by mixing the sulfur-carbon composite described above with an electrically conductive material and a binder, followed by drying for 4 to 12 hours at 40 to 70° C.

Specifically, in order to impart additional conductivity to the prepared sulfur-carbon composite, an electrically conductive material may be added to the positive electrode composition. The electrically conductive material serves to smoothly move electrons in the positive electrode. The electrically conductive material is not particularly limited as long as it is excellent in conductivity and can provide a large surface area without causing chemical changes in the battery, but preferably a carbon-based material is used.

The carbon-based material may be any one selected from the group consisting of graphite-based materials such as natural graphite, artificial graphite, expanded graphite, and graphene; active carbon-based material; carbon black-based materials such as channel black, furnace black, thermal black, contact black, lamp black, and acetylene black; carbon fiber-based material; carbon nano structures such as carbon nanotube (CNT) and fullerene; and a combination thereof.

In addition to the carbon-based materials, metallic fiber such as metal mesh; metallic powder such as copper (Cu), silver (Ag), nickel (Ni), and aluminum (Al); or organic electrically conductive materials such as polyphenylene derivatives may also be used according to purpose. The electrically conductive materials may be used alone or in a combination thereof.

In addition, in order to provide adhesion to the current collector with the positive electrode active material, the positive electrode composition may additionally comprise a binder. The binder should be well dissolved in a solvent, and the binder not only has to constitute an electrically conductive network between the positive electrode active material and the conductive material, but also should have a moderate impregnation property for an electrolyte solution.

The binder applicable to the present invention may be any binder known in the art, and specifically may be at least one selected from the group consisting of fluororesin-based binders comprising polyvinylidene fluoride (PVdF) or polytetrafluoroethylene (PTFE); rubber-based binders comprising styrene-butadiene rubber, acrylonitrile-butadiene rubber, and styrene-isoprene rubber; cellulosic binders comprising carboxy methyl cellulose (CMC), starch, hydroxypropyl cellulose, and regenerated cellulose; polyalcohol-based binder; polyolefin-based binders comprising polyethylene and polypropylene; polyimide-based binders, polyester-based binders, and silane-based binders, or a mixture or copolymer of two or more of these, but is not limited thereto.

The content of the binder resin may be, but is not limited to, 0.5 to 30 wt. % based on the total weight of the positive electrode. If the content of the binder resin is less than 0.5 wt. %, the physical properties of the positive electrode may be degraded and thus the positive electrode active material and electrically conductive material may be eliminated. If the content exceeds 30 wt. %, the ratio of the active material and the electrically conductive material in the positive electrode is relatively reduced and thus the capacity of the battery can be reduced.

The solvent for making the positive electrode composition in slurry state should be easy to dry, and should dissolve the binder well, but a solvent capable of keeping the positive electrode active material and the electrically conductive material in a dispersed state without dissolving them is most preferable. If the solvent dissolves the positive electrode active material, since the specific gravity (D=2.07) of sulfur in the slurry is high, there is a tendency that the sulfur is submerged in the slurry, which in turn causes sulfur to flow into the current collector during coating and cause problems with regard to the electrically conductive network, thereby causing problems with regard to the operation of the battery.

The solvent according to the present invention may be water or an organic solvent. The organic solvent may be an organic solvent comprising at least one selected from the group consisting of dimethylformamide, isopropyl alcohol, acetonitrile, methanol, ethanol, and tetrahydrofuran.

The mixing of the positive electrode composition can be carried out by a conventional method using a conventional mixer such as a paste mixer, a high-speed shear mixer, or a homo-mixer.

The positive electrode composition may be applied to a current collector and vacuum dried to form a positive electrode. The slurry can be coated on the current collector in an appropriate thickness depending on the viscosity of the slurry and the thickness of the positive electrode to be formed, and can be suitably selected within the range of 10 to 300 μm.

In that case, there is no limitation on the method of coating the slurry, and examples thereof may comprise doctor blade coating, dip coating, gravure coating, slit die coating, spin coating, comma coating, bar coating, reverse roll coating, screen coating, and cap coating methods.

The positive electrode current collector generally has a thickness of 3 to 500 μm and is not particularly limited as long as it has high conductivity without causing chemical changes in the battery. For example, a conductive metal such as stainless steel, aluminum, copper, or titanium, etc., can be used as the positive electrode current collector, and preferably an aluminum current collector can be used. The positive electrode current collector may be formed in various forms such as film, sheet, foil, net, porous body, foam, or nonwoven fabric.

Lithium Secondary Battery

In one embodiment of the present invention, the lithium secondary battery may comprise the positive electrode described above; a negative electrode comprising lithium metal or lithium alloy as a negative electrode active material; a separator interposed between the positive electrode and the negative electrode; and an electrolyte impregnated in the negative electrode, the positive electrode and the separator, and containing lithium salt and organic solvent. Preferably, the lithium secondary battery may be a lithium-sulfur battery comprising a sulfur compound in a positive electrode active material in the positive electrode.

The negative electrode may comprise a material capable of reversibly intercalating or deintercalating lithium ion (Lit), a material capable of reacting with lithium ion to reversibly form a lithium-containing compound, lithium metal, or a lithium alloy as a negative electrode active material. The material capable of reversibly intercalating or deintercalating lithium ion may be, for example, crystalline carbon, amorphous carbon, or mixtures thereof. The material capable of reacting with lithium ion ($Li^+$) to reversibly form the lithium-containing compound may be, for example, tin oxide, titanium nitrate, or silicon. The lithium alloy may be, for example, an alloy of lithium and the metal selected from the group consisting of Na, K, Rb, Cs, Fr, Be, Mg, Ca, Sr, Ba, Ra, Al, and Sn.

Also, in the process of charging/discharging lithium-sulfur battery, sulfur used as a positive electrode active material can be changed to an inactive material and then attached to the surface of the lithium negative electrode. As mentioned above, the inactive sulfur means sulfur which is no longer able to participate in the electrochemical reaction of the positive electrode through various electrochemical or chemical reaction. The inactive sulfur formed on the surface of the lithium negative electrode also has the advantage of acting as a protective layer of the lithium negative electrode. Therefore, the lithium metal and the inactive sulfur formed on the lithium metal, such as lithium sulfide, may be used as a negative electrode.

The negative electrode of the present invention may further comprise a pretreatment layer made of a lithium ion conductive material, and a lithium metal protective layer formed on the pretreatment layer, in addition to the negative electrode active material.

The separator interposed between the positive electrode and the negative electrode separates or isolates the positive and negative electrodes from each other, allows the transport of lithium ions between the positive and negative electrodes, and can be made of porous nonconductive or insulating materials. The separator may be an independent member such as a film or a thin film as an insulator having high ion permeability and mechanical strength, or may be a coating layer added to the positive electrode and/or the negative electrode. Also, when a solid electrolyte such as a polymer is used as an electrolyte, the solid electrolyte may also serve as a separator.

The separator preferably has a pore diameter of 0.01 to 10 μm and a thickness of 5 to 300 μm. Glass electrolyte, polymer electrolyte or ceramic electrolyte, etc., can be used as the separator. For example, olefin-based polymers such as polypropylene having chemical resistance and hydrophobicity, a sheet or nonwoven fabric made of glass fiber or polyethylene, Kraft paper and the like are used. Representative examples currently available on the market comprise Celgard® series (Celgard® 2400, 2300 product from Hoechest Celanese Corp.), polypropylene separator (product from Ube Industries Ltd. or product from Pall RAI), polyethylene series (Tonen or Entek), and the like.

The electrolyte separator in the form of solid may comprise less than about 20% by weight of non-aqueous organic solvent. In this case, an appropriate gelling agent may be comprised to reduce the fluidity of the organic solvent. Representative examples of such gelling agent may comprise polyethylene oxide, polyvinylidene fluoride, and polyacrylonitrile, etc.

The electrolyte impregnated to the negative electrode, the positive electrode, and the separator may be a non-aqueous electrolyte, organic solid electrolyte, or inorganic solid electrolyte, etc., wherein, the non-aqueous electrolyte may be composed of a lithium salt and a non-aqueous electrolyte solvent.

The lithium salt of the present invention is a substance which can be easily dissolved in a non-aqueous organic solvent, and for example, may comprise at least one selected from the group consisting of LiSCN, LiCl, LiBr, LiI, LiPF$_6$, LiBF$_4$, LiSbF$_6$, LiAsF$_6$, LiB$_{10}$Cl$_{10}$, LiCH$_3$SO$_3$, LiCF$_3$SO$_3$, LiCF$_3$CO$_2$, LiClO$_4$, LiAlCl$_4$, Li(Ph)$_4$, LiC(CF$_3$SO$_2$)$_3$, LiN(FSO$_2$)$_2$, LiN(CF$_3$SO$_2$)$_2$, LiN(C$_2$F$_5$SO$_2$)$_2$, LiN(SFO$_2$)$_2$, LiN(CF$_3$CF$_2$SO$_2$)$_2$, lithium chloroborane, lithium lower aliphatic carboxylate, lithium tetraphenyl borate, lithium imide, and a combination thereof.

The concentration of the lithium salt may be 0.2 to 2 M, specifically 0.6 to 2 M, more specifically, 0.7 to 1.7 M, depending on various factors such as the exact composition of the electrolyte mixture, the solubility of the salt, the conductivity of the dissolved salt, the charge and discharge conditions of the battery, the operating temperature and other factors known in the lithium battery field. If the concentration of the lithium salt is less than 0.2 M, the conductivity of the electrolyte may be lowered and thus the performance of the electrolyte may be deteriorated. If the concentration of the lithium salt exceeds 2 M, the viscosity of the electrolyte may increase and thus the mobility of the lithium ion (Lit) may be reduced.

The non-aqueous organic solvent should dissolve the lithium salt well, and the non-aqueous organic solvent of the present invention may comprise, for example, aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxyethane, 1,2-diethoxyethane, tetrahydrofuran, 2-methyl tetrahydrofuran, dimethylsulfoxide, 1,3-dioxolane, 4-methyl-1,3-dioxane, diethylether, formamide, dimethylformamide, dioxolane, acetonitrile, nitromethane, methyl formate, methyl acetate, phosphate triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate, and these organic solvents can be used alone or in a mixed solvent form of two or more solvents thereof.

As the organic solid electrolyte, for example, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte, for example, nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$ and the like may be used.

To the electrolyte of the present invention, for example, pyridine, triethylphosphite, triethanolamine, cyclic ether, ethylene diamine, n-glyme, hexamethylphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, or aluminum trichloride, etc. may also be added for the purpose of improving charging•discharging characteristics, flame retardancy, and the like. In some cases, a halogen-containing solvent such as carbon tetrachloride, ethylene trifluoride or the like can be also added for the purpose of imparting nonflammability, and a carbon dioxide gas can be further comprised for the purpose of improving storage characteristics at a high temperature, and fluoroethylene carbonate (FEC), propene sultone (PRS), fluoropropylene carbonate (FPC) and the like can be further comprised.

The electrolyte may be used as a liquid electrolyte and also as an electrolyte separator form in a solid state. When being used as a liquid electrolyte, a separator made of porous glass, plastic, ceramic, or polymer is further comprised as a physical separator having a function of physically separating the electrode.

Hereinafter, preferred examples will be presented to facilitate understanding of the present invention. However, it will be apparent to those skilled in the art that the following examples are illustrative of the present invention and that various changes and modifications can be made within the scope and spirit of the present invention, and that such variations and modifications are within the scope of the appended claims.

EXAMPLES

Preparation of Sulfur-Carbon Composite

Example 1

5 g of a coating solution was prepared by dissolving 0.2 g of PEG-b-PEDOT (Sigma-aldrich) in THF.

Thereafter, 0.5 g of carbon nanotube was mixed into the solution, stirred in a mortar for 15 minutes, and dried in an oven at 80° C. for 30 minutes to prepare a carbon nanotube coated with PEG-b-PEDOT.

Thereafter, the carbon nanotubes coated with PEG-b-PEDOT prepared above and 1.5 g of sulfur were evenly mixed, and then melt-diffused at 155° C. for 30 minutes to prepare a sulfur-carbon composite.

Example 2

A sulfur-carbon composite was prepared in the same manner as in Example 1, except that 0.4 g of PEG-b-PEDOT (sigma-aldrich) was dissolved in THF to prepare 5 g of a coating solution.

Comparative Example 1

A sulfur-carbon composite was prepared in the same manner as in Example 1, except that carbon nanotubes without PEG-b-PEDOT were used.

Comparative Example 2

A sulfur-carbon composite was prepared in the same manner as in Example 1, except that 2 g of sulfur/carbon composite (sulfur 1.5 g) was evenly mixed and polyethyleneimide instead of PEG-b-PEDOT was coated on the sulfur-carbon composite.

Comparative Example 3

2 g of sulfur/carbon composite (sulfur 1.5 g) was mixed evenly and melt-diffused at 155° C. for 30 minutes to prepare a sulfur-carbon composite. Then, 0.2 g of PEG-b-PEDOT (sigma-aldrich) was dissolved in THF to prepare 5 g of a coating solution. Thereafter, 2 g of sulfur/carbon composite was mixed into the solution, stirred in a mortar for 15 minutes, and dried in an oven at 80° C. for 30 minutes to prepare a sulfur/carbon composite coated with PEG-b-PEDOT.

Comparative Example 4

A sulfur-carbon composite was prepared in the same manner as in Example 1, except that the 2 g of sulfur/carbon composite was evenly mixed and coated with polyimide instead of PEG-b-PEDOT.

Comparative Example 5

A sulfur-carbon composite was prepared in the same manner as in Example 1, except that polyethylene oxide was used in place of PEG-b-PEDOT (sigma-aldrich).

Experimental Example 1: Results of Thermogravimetric Analysis (TGA) of Polymeric Coated Sulfur-Carbon Composites The sulfur-carbon composite coated with PEG-b-PEDOT prepared in Example 1 and the sulfur-carbon composite prepared in Comparative Example 1 were subjected to thermogravimetric analysis (TGA, Mettler-Toledo, TGA2). The results are shown in FIG. 2.

As shown in FIG. 1, it was found that the PEG-b-PEDOT was doped by about 40 parts by weight in the sulfur-carbon composite prepared in Example 1, relative to 100 parts by weight of carbon material.

Experimental Example 2: Battery Performance Evaluation 1

Using the composites prepared in Example 1 and Comparative Example 1, a slurry was prepared while mixing with the weight ratio of the sulfur-carbon composite:the electrically conductive material:the binder=90:5:5. The prepared slurry was applied to a current collector of aluminum foil having a thickness of 20 μm, dried in an oven at 80° C. for 30 minutes, and then rolled to prepare a positive electrode. At this time, carbon black was used as an electrically conductive material, and styrene butadiene rubber and carboxymethyl cellulose were used as a binder. Thereafter, a lithium secondary battery coin cell was manufactured using polyethylene as a separator and lithium foil having a thickness of 150 μm as a negative electrode.

At this time, in the coin cell, electrolyte prepared by dissolving 1 M LiFSI, 1% LiNO$_3$ in an organic solvent consisting of diethylene glycol dimethyl ether and 1,3-dioxolane (DEGDME:DOL=6:4 (volume ratio)) was used.

Thereafter, the manufactured coin cell was measured for a capacity of 1.8 to 2.6 V using a charging/discharging measuring device. Specifically, the cell test was performed by repeating the cycles of 0.1C/0.1C, 0.3C/0.3C, 0.5C/0.5C charging/discharging until the degeneration of the cell. The results obtained at this time are shown in FIGS. 3 and 4.

Referring to FIG. 3, the lithium secondary battery manufactured from the sulfur-carbon composite of Example 1 was found to have improved lifetime characteristics, as compared to the lithium secondary batteries manufactured from the sulfur-carbon composites of Comparative Examples 1 and 5.

Referring to FIG. 4, it can be seen that when the cationic conductive polymer is coated on the carbon material, the lithium-sulfur battery manufactured from the sulfur-carbon composite of Example 1 is reduced in overvoltage compared to the reference electrode, as compared to the lithium secondary batteries manufactured from the sulfur-carbon composites of Comparative Examples 1 and 5.

Experimental Example 3: Battery Performance Evaluation 2

A coin cell was manufactured in the same manner as in Experimental Example 2, using composites prepared in Comparative Example 1 and Comparative Examples 2 to 4, and thereafter, a cell test was performed. The results obtained at this time are shown in FIGS. 5 to 7.

Referring to FIG. 5, it was found through comparison of sulfur-carbon composites of Comparative Examples 1, 2, and 4 that when an organic material other than PEG-b-PEDOT is coated on the outside of the composite or coated on a carbon nanotube as a carbon nanotube coating material, overvoltage and reactivity were lowered even as compared to Comparative Example 1 without any coating.

Referring to FIG. 6, it was found through comparison of sulfur-carbon composites of Example 1 and Comparative Example 3 that when PEG-b-PEDOT is coated on the outside of sulfur/carbon composite, the effect was inferior as compared to Example 1 in which PEG-b-PEDOT was coated on CNT.

Referring to FIG. 7, it was found through comparison of sulfur-carbon composites of Comparative Example 1 and Comparative Example 4 that when a material with a functional group (—N source) capable of binding to LiPS among the various materials is used, not only is the added mass higher than that of the PEG-b-PEDOT of the example, but also the reactivity is lower than that of Comparative Example 1 without any coating.

The invention claimed is:

1. A sulfur-carbon composite comprising:
   a porous carbon material comprising interior and exterior surfaces coated with a polymer comprising an ion conductive functional group and an electron conductive functional group; and
   sulfur present on at least a portion of inside pores and on a surface of the porous carbon material,
   wherein the sulfur and the porous carbon material are present in the sulfur-carbon composite in a weight ratio of 9:1 to 7:3; and
   wherein the polymer comprising the ion conductive functional group and the electron conductive functional group is a compound of Formula 1 below:

[Formula 1]

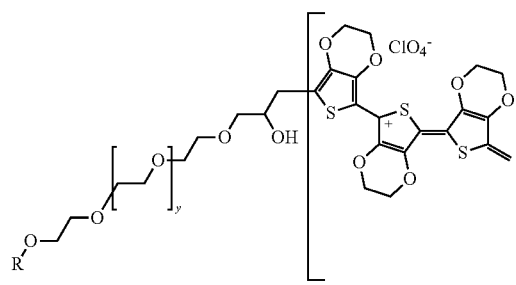

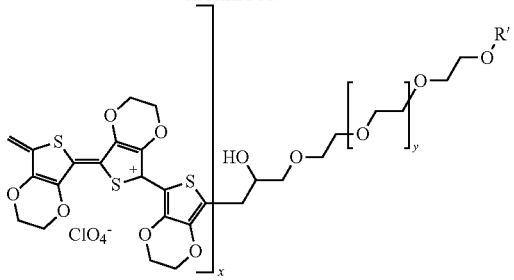

wherein x and y are ratios of the respective monomers, x is 0 to 1, y is 1-x, and R and R' are each independently a $C_1$ to $C_{20}$ hydrocarbon group.

2. The sulfur-carbon composite according to claim 1, wherein a content of the polymer comprising the ion conductive functional group and the electron conductive functional group is 0.5% by weight to 5.0% by weight relative to a total weight of the sulfur-carbon composite.

3. The sulfur-carbon composite according to claim 1, wherein a loading amount of sulfur is 5 $mg/cm^2$ to 20 $mg/cm^2$.

4. The sulfur-carbon composite according to claim 1, wherein the porous carbon material comprises at least one selected from the group consisting of graphite, graphene, carbon black, carbon nanotube, carbon fiber, and activated carbon.

5. A positive electrode for a lithium secondary battery comprising the sulfur-carbon composite of claim 1.

6. A method for preparing the sulfur-carbon composite according to claim 1, comprising the steps of:
   (a) preparing a porous carbon material coated with a polymer comprising an ion conductive functional group and an electron conductive functional group by mixing porous carbon material in a solution comprising the polymer comprising the ion conductive functional group and the electron conductive functional group and then drying the resulting mixture; and
   (b) preparing a sulfur-carbon composite by mixing sulfur with the porous carbon material coated with the polymer comprising the ion conductive functional group and the electron conductive functional group, wherein the sulfur and the porous carbon material are present in the sulfur-carbon composite in a weight ratio of 9:1 to 7:3, and
   (c) heat-treating the resulting mixture,
   wherein the polymer comprising the ion conductive functional group and the electron conductive functional group is a compound of Formula 1 below:

[Formula 1]

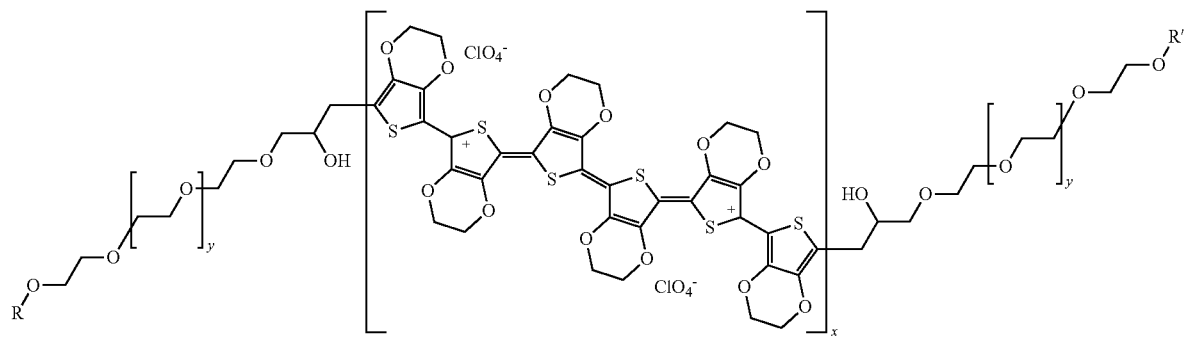

wherein x and y are ratios of the respective monomers, x is 0 to 1, y is 1-x, and R and R' are each independently a $C_1$ to $C_{20}$ hydrocarbon group.

7. The method for preparing the sulfur-carbon composite according to claim 6, wherein the porous carbon material comprises at least one selected from the group consisting of graphite, graphene, carbon black, carbon nanotube, carbon fiber, and activated carbon.

8. The method for preparing the sulfur-carbon composite according to claim 6, wherein the polymer comprising the ion conductive functional group and the electron conductive functional group comprises one or more selected from the group consisting of polyethylene glycol (PEG) and polyethylene oxide; and one or more selected from the group consisting of poly (3,4-ethylenedioxythiophene) (PEDOT), thiophene, and pyrrole.

9. The method for preparing the sulfur-carbon composite according to claim 6, wherein the solution comprises at least one solvent selected from the group consisting of ethanol and tetrahydrofuran (THF).

\* \* \* \* \*